United States Patent [19]

Dempsey et al.

[11] Patent Number: 5,389,696
[45] Date of Patent: Feb. 14, 1995

[54] PROCESS FOR THE PRODUCTION OF MOLDED PRODUCTS USING INTERNAL MOLD RELEASE AGENTS

[75] Inventors: Michael P. Dempsey, Aliquippa; Gene Symosko, Oakdale; Merle W. Lesko, McDonald; Ronald L. Zacour, Washington, all of Pa.

[73] Assignee: Miles Inc., Pittsburgh, Pa.

[21] Appl. No.: 275,468

[22] Filed: Jul. 14, 1994

Related U.S. Application Data

[63] Continuation-in-part of Ser. No. 123,491, Sep. 17, 1993, abandoned.

[51] Int. Cl.$^6$ .............................................. C08G 18/16
[52] U.S. Cl. ...................................... 521/128; 521/130; 521/170
[58] Field of Search ................. 521/130, 170, 128

[56] References Cited

U.S. PATENT DOCUMENTS

| | | | |
|---|---|---|---|
| 3,726,952 | 4/1973 | Boden et al. | 264/48 |
| 3,875,069 | 4/1975 | Worschech et al. | 252/56 S |
| 4,058,492 | 11/1977 | von Bonin et al. | 260/2.5 AM |
| 4,098,731 | 7/1978 | von Bonin et al. | 521/51 |
| 4,111,861 | 9/1978 | Godlewski | 521/123 |
| 4,130,698 | 12/1978 | Sparrow et al. | 521/130 |
| 4,201,847 | 5/1980 | Kleimann et al. | 521/172 |
| 4,254,228 | 3/1981 | Kleimann et al. | 521/128 |
| 4,499,254 | 2/1985 | Dominguez et al. | 528/49 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |
| 4,764,537 | 8/1988 | Horn et al. | 521/51 |
| 4,868,224 | 9/1989 | Harasin et al. | 521/124 |
| 5,019,317 | 5/1991 | Slocum et al. | 264/300 |
| 5,182,034 | 1/1993 | Meyer et al. | 252/32.5 |

FOREIGN PATENT DOCUMENTS

| | | |
|---|---|---|
| 2101140 | 1/1983 | United Kingdom . |
| 1365215 | 8/1984 | United Kingdom . |

Primary Examiner—Morton Foelak
Attorney, Agent, or Firm—Joseph C. Gil; N. Denise Brown

[57] ABSTRACT

The present invention is directed to an improved internal mold release system for the production of low density molded foam parts. The process comprises reacting a reaction mixture of an isocyanate and at least one organic compound containing isocyanate-reactive hydrogens in the presence of a blowing agent, a catalyst, a surfactant, an IMR, and, optionally, a reinforcing agent, in a closed mold. The IMR comprises:

a) mixed esters comprising the reaction product of i) aliphatic dicarboxylic acids, ii) aliphatic polyols, and iii) monocarboxylic acids with 12 to 30 carbon atoms in the molecule. The IMR may additionally comprise b) and/or c) wherein:

b) represents a compound comprising the reaction product of i) N,N-dimethylpropylene diamine with ii) a compound selected from the group consisting of tall oil, $C_{8-20}$ monofunctional carboxylic acids, and mixtures of $C_{8-20}$ monofunctional carboxylic acids; and c) represents a compound comprising the reaction product of oleic acid, adipic acid, and pentaerythritol; with the proviso that the reaction product of a) is different than the reaction product of c).

13 Claims, No Drawings

PROCESS FOR THE PRODUCTION OF MOLDED PRODUCTS USING INTERNAL MOLD RELEASE AGENTS

This application is a continuation-in-part of application Ser. No. 08/123,491, filed on Sep. 17, 1993, abandoned.

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases; i) mixtures of aliphatic or aryl carboxylic acid and a polar metal compound; ii) carboxyalkylsiloxanes; iii) aliphatic glyoximes; and iv) aralkyl ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731).

Zinc carboxylates containing from 8 to 24 carbon atoms per carboxylate group have also been described (U.S. Pat. Nos. 4,519,965, 4,581,386, 4,585,803 and 4,764,537, and British Patent 2,101,140). Release agents containing zinc carboxylates in combination with primary or secondary amine compatibilizers and an organic material containing a carboxylic acid group, a phosphorous containing acid group or a boron containing acid group, are described and published in European Patent Application 0,119,471.

Recently, a system which provides release from a bare metal mold has been developed. The system utilizes the reaction product of an organic polyisocyanate and an active hydrogen containing a fatty acid ester in the A-side and a zinc carboxylate in the B-side (see, U.S. Pat. No. 4,868,224). One problem with this system is that the zinc carboxylate/solubilizer combination catalyzes the hydroxyl/isocyanate reaction. This makes the system relatively fast, leading to difficulties in filling large molds. It is known to add fatty acids to polyurea systems in order to increase the green strength and aid in mold release (see, U.S. Pat. No. 4,499,254). Another known system which releases from bare metal molds is disclosed in U.S. Pat. No. 5,019,317. It uses a similar isocyanate/fatty acid ester reaction product and zinc carboxylate combination as described hereinabove to produce a molded product.

U.S. Pat. No. 3,875,069 discloses lubricant compositions which are said to be useful in the shaping of thermoplastic materials. These lubricant materials comprise (A) mixed esters with hydroxyl and acid numbers of 0 to 6 of (a) alkane polyols, (b) a dicarboxylic acid, and (c) aliphatic hydrocarbon monocarboxylic acids, said mixed esters having a molecular weight of at least 524; and (B) esters selected from the group consisting of (1) esters of the dicarboxylic acids of (A)(b) and aliphatic monofunctional alcohols, (2) esters of aliphatic monofunctional alcohols and aliphatic hydrocarbon monocarboxylic acids, and (3) complete esters or partial esters of alkanepolyols and aliphatic hydrocarbon monocarboxylic acids, with the ratio by weight of (A) to (B) being from 1:3 to 9:1.

The present invention is directed to a new internal mold release agent which provides excellent release from metal molds.

DESCRIPTION OF THE INVENTION

The present invention is directed to an improved internal mold release system for the production of low density molded foam pads, i.e. molded pads having a density of from 0.25 to 1.25 g/cc. In particular, the process comprises reacting a reaction mixture comprising an organic polyisocyanate and at least one organic compound containing isocyanate-reactive hydrogens in the presence of a blowing agent, a catalyst, a surfactant, and an internal mold release agent in a closed mold. The internal mold release agent comprises:

a) from 1 to 10% by weight, based on the weight of the reaction mixture, of mixed esters comprising the reaction product of
   i) aliphatic dicarboxylic acids,
   ii) aliphatic polyols, and
   iii) monocarboxylic acids with 12 to 30 carbon atoms in the molecule, wherein said reaction product has an acid number of less than 25 and a hydroxyl number of less than 25, and preferably both are less than 15.

It is preferred that component a) comprises the reaction product of i) adipic acid, ii) pentaerythritol, and iii) oleic acid, wherein said reaction product has an acid number of less than 25 and a hydroxyl number of less than 25, and preferably both are less than 15.

Preferrably, the internal mold release agent contains from 1 to 6% by weight, based on the weight of the reaction mixture, of component a).

The internal mold release agents of the present invention are used in the absence of esters selected from the group consisting of:

(1) esters of (i) dicarboxylic acids and (ii) aliphatic monofunctional alcohols of 12 to 30 carbon atoms, (2) esters of (i) aliphatic monofunctional alcohols having 12 to 30 carbon atoms and (ii) aliphatic hydrocarbon monocarboxylic acids with 12 to 30 carbon atoms, and (3) complete esters or partial esters of (i) aliphatic polyols and (ii) aliphatic hydrocarbon monocarboxylic acids having 12 to 30 carbon atoms. These esters which are to be excluded from the internal mold release agent of the present invention are further described as component (B) in U.S. Pat. No. 3,875,069 at column 3, lines 36–46 and at column 7, line 1 through column 8, line 59.

In accordance with the present invention, the internal mold release agent may additionally comprise:

b) from 0.3 to 5% by weight, based on the weight of the reaction mixture, of a compound comprising the reaction product of
   i) N,N-dimethylpropylene diamine, with
   ii) a compound selected from the group consisting of tall oil, a $C_{8-20}$ monofunctional carboxylic acid, and mixtures of $C_{8-20}$ monofunctional carboxylic acids;

wherein said reaction product has an acid number of from 60 to 100, and preferably of from 80 to 86, and a hydroxyl number of about 0.

It is preferred that the internal mold release agent contains from 0.9 to 3% by weight, based on the weight of the reaction mixture, of component b).

In addition to components a) and b), the internal mold release agent may additionally comprise:

c) from 1 to 3% by weight, based on the weight of the reaction mixture, of a compound comprising the reaction product of oleic acid, adipic acid, and pentaerythritol, wherein said reaction product has an acid number of from 0 to 100 and a hydroxyl number of from 15 to 150; with the proviso that the reaction product of a) is different than the reaction product of c).

It is preferred that the internal mold release agent contains from 1.0 to 2.5% by weight, based on the weight of the reaction mixture, of component c).

It is also possible to use component a) with component c) as an IMR in the present invention.

It has been found that the particular combinations of materials described hereinabove give excellent release from a variety of different mold surfaces, such as steel or aluminum. As is typical in the industry, an application of paste wax is applied to the surface of the mold. Conventional paste waxes are commercially available from Chem-Trend, Inc. One such example is RCT-C-2080. The paste wax fills the pores of the tool and forms a barrier coat to keep the urethane/urea from sticking to the tool. Without the use of IMR agents, the wax would be removed with the first molded part and the following part would stick to the tool.

One spray of external mold release to the surface of the mold was found to further enhance the releasability. A typical example of the conventional external mold release agents is RCTW-2069B which is commercially available from Chem-Trend, Inc.

It is also possible that the reaction mixture contains fillers and/or reinforcing agents in quantities of up to about 40% by weight, and preferably from about 5 to 35% by weight, based on the weight of said reaction mixture.

Suitable compounds to be used as component a) are the mixed esters comprising the reaction product of i) aliphatic dicarboxylic acids, ii) aliphatic polyols, and iii) monocarboxylic acids with 12 to 30 carbon atoms in the molecule; wherein the reaction product has an acid number of less than 25 and a hydroxyl number of less than 25 (and preferably both are less than 15), are compounds such as those described, for example, in U.S. Pat. No. 3,875,069, the entirety of which is herein incorporated by reference. More specifically, U.S. Pat. No. 3,875,069 describes a component (A) of mixed esters which are suitable to be used in the present invention as component a). Although these mixed esters are described in U.S. Pat. No. 3,875,069 as having acid and hydroxyl numbers of 0 to 6, this can easily be altered by one of ordinary skill in the art, for example, by modifying the quantities of the individual components relative to each other. This same U.S. Patent also describes a process of making these compounds which are suitable for use as component a) in the present invention.

It is preferred that the compound used as component a) in the present invention comprises the reaction product of i) adipic acid, ii) pentaerythritol, and iii) oleic acid, wherein said reaction product has an acid number of less than 25 and a hydroxyl number of less than 25, and preferably both are less than 15. A particularly preferred compound to be used as component a) in the present invention is Loxiol G-71S, commercially available from Henkel Corporation. U.S. Pat. No. 3,875,069 describes this compound and a process for making it.

Suitable compounds to be used as component b) in the present invention include those compounds comprising the reaction product of i) N,N-dimethylpropylene diamine, with ii) a compound selected from the group consisting of tall oil, a $C_{8-20}$ monofunctional carboxylic acid, and a mixture of $C_{8-20}$ monofunctional carboxylic acids; wherein the reaction product has an acid number of from 60 to 100, preferably from 80 to 86, and a hydroxyl number of about 0.

Suitable compounds which correspond to the reaction product of N,N-dimethylpropylene diamine and tall oil include those which are described in, for example, U.S. Pat. No. 3,726,952, incorporated herein by reference.

Suitable compounds to be used as the $C_{8-20}$ monofunctional carboxylic acids for the production of component b) include the saturated or unsaturated monocarboxylic acids. This includes compounds such as, for example, oleic acid, myristic acid, stearic acid, palmitic acid, arachidic acid, caprylic acid, linoleic acid, linolenic acid, etc. Mixtures of these acids may also be used in the process of the present invention. Of these monocarboxylic acids, it is preferred to use oleic acid, myristic acid, and stearic acid.

It is most preferred that component b) of the present invention comprises the reaction product of N,N-dimethylpropylene diamine and tall oil.

Suitable compounds to be used as component c) in the present invention include those compounds comprising the reaction product of oleic acid, adipic acid, and pentaerythritol, wherein said reaction product has an acid number of from 0 to 100 and a hydroxyl number of from 15 to 150; with the proviso that the reaction product of a) is different than the reaction product of c). These compounds are described, for example, in U.S. Pat. No. 4,254,228, herein incorporated by reference.

Starting polyisocyanate components for use in the present invention include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate, 1,4-tetramethylene diisocyanate, 1,6-hexamethylene diisocyanate; 1,12-dodecane diisocyanate, cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydrotolylene diisocyanate and mixtures of these isomers. Hexahydro-1,3 -and/or -1,4-phenylene diisocyanate; perhydro-2,4'- and/or -4,4'-diphenylmethane diisocyanate; 1,3- and 1,4-phenylene diisocyanate; 1,4- and 2,5-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4'-4"-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 89,050 are also suitable.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4'-diisocyanato-diphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic cycloaliphatic isocyanates are less suitable for the purposed of the instant invention.

Also preferred isocyanates to be used in the process of the invention are the polyphenyl-polymethylene polyisocyanates obtained by the phosgenation of an aniline/formaldehyde condensate.

Also necessary for preparing the molded product of the present invention is an isocyanate reactive component. Generally, isocyanate reactive compounds include, for example, organic compounds containing hydroxyl groups or amine groups. It is generally preferred to include hydroxyl group containing compounds. These materials may be typically divided into two groups, high molecular weight compounds having a molecular weight of 400 to 10,000 and low molecular weight compounds, i.e., chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 hydroxyl groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the present of $BF_3$ or chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. Polyethers modified by vinyl polymers, of the type formed, for example, by polymerizing styrene or acrylonitrile in the presence of polyether (U.S. Pat. Nos. 3,383,351); 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found for example in High Polymers, Volume XVI, "Polyurethanes, Chemistry and Technology", by Saunders-Frisch, Interscience Publishers, New York, London, Vol. I, 1962, pages 32–42 and 44–54, and Volume II. 1964, pages 5–6 and 198–199; and in Kunststoff-Handbuch, Vol. VII, Vieweg-Hochtlen, Carl-Hanser-Verlag, Munich, 1966, pages 45–71.

In accordance with the present invention, the high molecular weight compounds can be used in a mixture with low molecular weight chain extenders. The low molecular weight chain extenders are also suitable to be used as the sole isocyanate-reactive compound for the present invention. It is preferred some low molecular weight chain extender be present in the isocyanate-reactive compound used in the present invention. Examples of suitable hydroxyl group-containing chain extenders include ethylene glycol, 1,2- and 1,3-propylene diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-1,2,4-diamino benzene, 1-methyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,-6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino-diphenylmethane, 1,2- and 1,4-phenylene diamine, naphthalene-1,5-diamine and triphenylmethane-4,4'-4''-triamine. The trifunctional and poly-functional aromatic amine compounds may also exclusively or partly contain secondary amino groups such as 4,4'-di-(methylamino)diphenylmethane or 1-methyl-2-methylamino-4-amino-benzene. Liquid mixtures of polyphenyl polymethylene-polyamines, of the type obtained by condensing aniline with formaldehyde, are also suitable. Generally, the non-sterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

The reaction mixture used in the present invention should also include blowing agents, catalysts, and surfactants.

Suitable blowing agents to be used in the present invention include, for example, halogenated hydrocarbons, water, low boiling solvents such as, for example, pentane, and other known blowing agents.

Other additives which may be used in the present invention include catalysts such as, for example, various organic metal compounds, including, for example, tin-(II) salts of carboxylic acids, dialkyl tin salts of carboxylic acids, dialkyl tin mercaptides, dialkyl tin dithioesters and tertiary amines, such as, for example, dimethylcyclohexylamine (i.e. Polycat 8), pentamethyldiethylenetriamine (i.e. Polycat 5), bis[2-(dimethylamino)ethyl]ether (Niax A-1), dimethylethanolamine (DMEA), Dabco WT, etc. Of course, it is also possible to use any of the catalysts which are well known to those skilled in the art of polyurethane chemistry. It is preferred to use tertiary amines as the catalysts in the present invention.

Surface-active additives such as emulsifiers and foam stabilizers are also included in the reaction mixture of the present invention. Some suitable surface-active additives include compounds such as, for example, N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salt of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565, the disclosure of which is herein incorporated by reference. Particularly preferred are the surfactants L-6980 and L-5340 which are commercially available from Union Carbide.

Fillers and reinforcing agents are also suitable for use in the presently claimed invention. Suitable fillers and reinforcing agents include both organic and inorganic compounds. These inorganic compounds include, for example, compounds such as glass in the form of fibers, flakes, cut fibers, mats, or microspheres; mica, wollastonite; carbon fibers; carbon black; talc; and calcium carbonate. Suitable organic compounds include, for example, expanded microspheres which are known and described in, for example, U.S. Pat. Nos. 4,829,094, 4,843,104, 4,902,722, and 4,959,395, the disclosures of which are herein incorporated by reference, and Applicants' co-pending U.S. application Ser. No. 08/006,560 filed on Jan. 21, 1993 (OUR DOCKET NO. Mo-3901), the disclosure of which is herein incorporated by reference. These include commercially available microspheres such as, for example, Dualite M6017AE, Dualite M6001AE, and Dualite M6029AE, all of which are available from Pierce & Stevens Corporation, and Expandocel which is available from Nobel Industries.

Reinforcing mats which are also useful in this invention comprise glass mats, graphite mats, polyester mats, polyaramide mats such as KEVLAR mats and mats made from any fibrous material. Also, this includes random continuous strand mats made of glass fiber bundles, woven mats and oriented mats such as, for example, uniaxial or triaxial mats.

The addition of these fillers and reinforcing agents to the reaction mixture of the presently claimed invention, make the molded parts suitable for use in RRIM (i.e. reinforced reaction injection molding) and SRIM (i.e. structural reaction injection molding) applications.

RRIM and SRIM are both methods of producing molded parts by reacting an isocyanate with a mixture containing isocyanate-reactive hydrogens via the conventional RIM process. In the SRIM process, a reinforcing mat is preplaced in the molding tool and the reactive mixture is injected into it. In the RRIM process, reinforcing fibers or fillers are mixed into one or both components, i.e. the isocyanate component and/or the mixture containing the isocyanate-reactive component, before the components are mixed via the RIM process.

In addition to the catalysts, surface-active agents, and fillers and reinforcing agents, other additives which may be used in the molding compositions of the present invention include known cell regulators, flame retarding agents, plasticizers, dyes, external mold release agents, etc.

Other possible additives include various non-catalysts compounds, which influence the reaction rate of the reaction mixture. These can be used to slow down the reaction rate and gel time of various reaction systems. Suitable compounds include, for example, acids such as those described in U.S. Pat. No. 4,499,254, incorporated herein by reference. Typical are those acids presented by the formula: $R(CO_2H)_n$, wherein n is 1, 2, or 3 and where R contains at least 10 carbon atoms. R may be alkyl (i.e. cyclic, linear, or branched), alkaryl, aralkyl, or aryl, saturated or unsaturated. Examples of useful acids include n-decanoic acid, neodecanoic acid, lauric acid, palmitic acid, stearic acid, isostearic acid, oleic acid, linoleic acid, lactic acid, and the like. The fatty acid can be used in either the A-side or the B-side of the reaction mixture. It is simply mixed with the particular component prior to use.

The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included.

It is also possible that the hereinabove described internal mold release compositions would be suitable for use in other processes, for example, RTM, i.e. resin transfer molding, processes.

The invention is further illustrated but is not intended to be limited by the following examples in which all parts and percentages are by weight unless otherwise specified.

EXAMPLES

The following examples were run on a Krauss Maffei HK-245 2-component RIM machine equipped with a heated steel mold to form flat plaques with a surface area of 2.5 square feet.

General Procedure

The polyurethane system used represents typical RIM 2-component systems. The A component is a typical polymeric diphenylmethane diisocyanate and is described hereinbelow. The B component is a mixture of polyether polyols and/or other organic compounds with isocyanate-active hydrogen, surfactant, blowing agent, catalyst, and IMR agents. The B component and IMR agents are also described hereinbelow.

Since the B component is not phase-stable, a high-shear mixer is used to obtain a homogeneous blend.

For RRIM (i.e. reinforced reaction injection molding) applications, a filler is added to the B component and mixed with the high-shear blade until a homogeneous blend is attained.

The B-component is transferred to the polyol tank of the RIM machine. This tank is equipped with a mechanical agitator which is used to keep the material homogeneous. Both the A and B components are pressurized with nitrogen.

The temperature of both components is maintained between 26° and 32° C.

The surface of the mold in both Examples 1 and 2 is pretreated with a conventional paste wax, RCT-C 2080, supplied by Chem-Trend, Inc. Then, an external mold release agent, i.e. RCTW-2069B, also supplied by Chem-Trend, Inc. was sprayed on top of the paste wax. No additional paste wax or external mold release was used after the molding of the first part. The mold temperature is maintained at approximately 71° C.

For SRIM (i.e. Structural RIM) applications, the desired number of reinforcing mats were preplaced into the tool. For each formulation listed in Example I below, one Owens Corning Fiberglass mat, i.e. M-8610, having the weight of 1 oz/ft$^2$ was placed in the tool.

Components A and B are impingement mixed and dispensed into the mold. After curing for 60 to 120 seconds, the mold is opened and the plaque is removed. In order to be considered a successful release, no sticking or tearing should be seen and no significant force should have to be applied to remove the part.

In Examples 1 and 2, the following isocyanates and polyols were used:

Isocyanate: A commercially available polymethylene poly(phenyl isocyanate) having an isocyanate group content of about 32% by weight, and having a diisocyanate content of about 48% by weight. The diisocyanate comprises about 5% by weight of 2,4'-methylene bis(phenyl isocyanate) and about 43% by weight of 4,4'-methylene bis(phenylisocyanate).

Polyol A: an adduct of glycerin and propylene oxide, having a molecular weight of about 160

Polyol B: an adduct of ethylene diamine with propylene oxide, having a molecular weight of about 355

Polyol C: an adduct of propylene glycol and propylene oxide, having a molecular weight of about 1000

Polyol D: glycerin

Polyol E: a mixture of sucrose, propylene glycol, and water in quantities such that about 44% of the hydroxyl groups are from sucrose, about 52% of the hydroxyl groups are from propylene glycol, and about 4% of the hydroxyl groups are from water; propylene oxide is then added to a hydroxyl number of about 380.

Polyol F: an adduct of m-TDA (i.e., toluenediamine) with a mixture of ethylene oxide and propylene oxide at a weight ratio of about 1:1.3 (EO:PO) to obtain a hydroxyl number of about 460

Example 1

According to the hereinabove described general procedure, a series of plaques were made with a base system and various levels of IMR agents. The A and B components were impingement mixed at ratios which result in an isocyanate index of 105–110. The mold temperature was 72° C. and the mold was prepared with one coat of paste wax and one spray of external mold release as described hereinabove.

| Component | Base B Components: PBW | Supplier |
|---|---|---|
| Polyol A | 40 | |
| Polyol B | 30 | |
| Polyol C | 20 | |
| Polyol D | 10 | |
| L-6980 | 2 | Union Carbide |
| Aromatic Diamine | 1.5 | |
| Water | 1.5 | |
| Desmorapid PV | .6 | Bayer |
| Dabco 8154 | .75 | Air Product |

L-6980: a surfactant which is commercially available from Union Carbide

Aromatic diamine: diethyltoluenediamine

Desmorapid PV: a tertiary amine catalyst which is commercially available from Bayer Dabco 8154: a tertiary amine catalyst which is commercially available from Air Products The quantity (i.e. parts by weight) of each of the three IMR agents and the number of releases obtained for those levels are shown in Table 1. The number of releases in the Table are the number of releases attained before a failure occurred. In Run 8, testing was stopped after obtaining 40 releases without a failure.

The IMR levels shown in Table 1 were added to the 106.35 parts by weight (i.e. total parts by weight>100) of the aforementioned base system, i.e. the B-side or the polyol-side of the formulation.

All parts were molded at a density of 0.5 g/co, and each part was molded using one 1 oz/ft$^2$ M-8610 fiberglass mat from Owens Corning.

IMR Agents

IMR a: Loxiol-G-71S, commercially available from Henkel; the reaction product of adipic acid, pentaerythritol, and oleic acid, having an acid number of less than 15 and an hydroxyl number of less than 15

IMR b: reaction product of N,N-dimethylpropylene diamine with tall oil

IMR c: reaction product of pentaerythritol, adipic add, and oleic acid; having an acid number of 3 and a hydroxyl number of 51.

TABLE 1

| RUN | IMR a | IMR b | IMR c | Releases | Ratio (A/B) |
| --- | --- | --- | --- | --- | --- |
| 1 | 5 | 2.5 | 0 | 6 | 2.05 |
| 2 | 5 | 5 | 5 | 12 | 1.93 |
| 3 | 10 | 2.5 | 5 | 7 | 1.89 |
| 4 | 10 | 2.5 | 7.5 | 15 | 1.85 |
| 5 | 10 | 5 | 0 | 8 | 1.93 |
| 6 | 15 | 0 | 0 | 1 | 1.92 |
| 7 | 15 | 5 | 0 | 18 | 1.85 |
| 8 | 15 | 5 | 5 | 40 + (w/o fail) | 1.79 |

Run number 6 appears to show that Loxiol-G-71S by itself does not work as an IMR agent. This result was probably due to the Loxiol complexing with the catalysts to render one or both of the catalysts ineffective, therefore leaving the urethane uncured at the prescribed demold time. Once the second IMR agent (i.e. IMR b, which is in itself catalytic) was added to the system, the undercuring dissappeared, and multiple releases were obtained. Loxiol as a single IMR agent worked very well in Example 2, run number 6.

EXAMPLE 2

According to the previously described general procedure, a series of plaques were made with a base system and various levels of IMR agents. The A and B components were impingement mixed at ratios which give an isocyanate index of 105-110. The mold temperature was 68° C. and the mold was prepared with one coat of paste wax and one spray of external mold release as described hereinabove.

| Base B Components: | | |
| --- | --- | --- |
| Component | PBW | Supplier |
| Polyol E | 25 | |
| Polyol F | 45 | |
| Polyol A | 30 | |
| Polyol B | 5 | |
| L-5340 | 3 | Union Carbide |
| Polycat 8 | 1 | Air Products |
| Water | 1 | |
| Dabco WT | 2 | Air Products |

L-5340: a surfactant which is commercially available from Union Carbide

Polycat 8: a tertiary amine catalyst which is commercially available from Air Products Dabco WT: a tertiary amine catalyst which is commercially available from Air Products The levels of IMR agents and the number of releases obtained at each level are listed in Table 2. These IMR levels are in addition to the 112 parts by weight (i.e. total parts by weight>100) of the base system, i.e. the B-side or the polyol-side of the formulation.

All parts were molded at a density of 0.6 g/cc, and no fillers or reinforcing agents were used for these evaluations.

IMR Agents

IMR a: Loxiol-G-71S, commercially available from Henkel; the reaction product of adipic acid, pentaerythritol, and oleic acid, having an acid number of less than 15 and an hydroxyl number of less than 15

IMR b: reaction product of N,N-dimethylpropylene diamine with tall oil

TABLE 2

| RUN | IMR a | IMR b | Releases | Ratio (A/B) |
| --- | --- | --- | --- | --- |
| 1 | 0 | 0 | 1 | 1.67 |
| 2 | 0 | 5 | 1 | 1.60 |
| 3 | 3 | 1 | 15 | 1.59 |
| 4 | 5 | 3 | 40 + (w/o fail) | 1.55 |
| 5 | 10 | 5 | 40 + (w/o fail) | 1.47 |
| 6 | 10 | 0 | 40 + (w/o fail) | 1.53 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a molded foam part having a density of from 0.25 to 1.25 g/cc, by reacting a reaction mixture comprising an organic polyisocyanate and at least one organic compound containing isocyanate-reactive hydrogens in the presence of a blowing agent, a catalyst, a surfactant, and an internal mold release agent in a closed mold, the improvement wherein said internal mold release agent comprises:

a) from 1 to 10% by weight, based on the weight of said reaction mixture, of mixed esters comprise the reaction product of
  i) aliphatic dicarboxylic acids,
  ii) aliphatic polyols, and
  iii) monocarboxylic acids with 12 to 30 carbon atoms in the molecule, wherein said reaction product has an acid number of less than 25 and a hydroxyl number of less than 25, with the proviso that said internal mold release agent excludes esters selected from the group consisting of: (1) esters of (i) dicarboxylic acids and (ii) aliphatic monofunctional alcohols of 12 to 30 carbon atoms, (2) esters of (i) aliphatic monofunctional alcohols having 12 to 30 carbon atoms and (ii) aliphatic hydrocarbon monocarboxylic acids with 12 to 30 carbon atoms, and (3) complete esters or partial esters of (i) aliphatic polyols and (ii) aliphatic hydrocarbon monocarboxylic acids having 12 to 30 carbon atoms.

2. The process of claim 1 wherein said reaction product has an acid number of less than 15 and a hydroxyl number of less than 15.

3. The process of claim 1, wherein said internal mold release agent additionally comprises:
   b) from 0.3 to 5% by weight, based on the weight of said reaction mixture, of a compound comprising the reaction product of
      i) N,N-dimethylpropylene diamine, with
      ii) a compound selected from the group consisting of tall oil, a $C_{8-20}$ monofunctional carboxylic acid, and mixture of $C_{8-20}$ monofunctional carboxylic acids;
wherein said reaction product has an acid number of from 60 to 100 and a hydroxyl number of about 0.

4. The process of claim 3, wherein said internal mold release agent additionally comprises:
   c) from 1 to 3% by weight, based on the weight of said reaction mixture, of a compound comprising the reaction product of oleic acid, adipic acid, and pentaerythritol, wherein said reaction product has an acid number of from 0 to 100 and a hydroxyl number of from 15 to 150; with the proviso that the reaction product of a) is different than the reaction product of c).

5. The process of claim 1, wherein said internal mold release agent comprises from about 1 to 6% by weight, based on the weight of said reaction mixture, of said component a).

6. The process of claim 5, wherein said internal mold release agent additionally comprises:
   b) from 0.3 to 5% by weight, based on the weight of said reaction mixture, of a compound comprising the reaction product of
      i) N,N-dimethylpropylene diamine, with
      ii) a compound selected from the group consisting of tall oil, a $C_{8-20}$ monofunctional carboxylic acid, and mixture of $C_{8-20}$ monofunctional carboxylic acids;
wherein said reaction product has an acid number of from 60 to 100 and a hydroxyl number of about 0.

7. The process of claim 6, wherein said internal mold release agent comprises from about 0.9 to 3% by weight, based on the weight of said reaction mixture, of said component b).

8. The process of claim 6, wherein said internal mold release agent additionally comprises:
   c) from 1 to 3% by weight, based on the weight of said reaction mixture, of a compound comprising the reaction product of oleic acid, adipic acid, and pentaerythritol, wherein said reaction product has an acid number of from 0 to 100 and a hydroxyl number of from 15 to 150; with the proviso that the reaction product of a) is different than the reaction product of c).

9. The process of claim 8, wherein said internal mold release agent comprises from about 1.0 to 2.5% by weight, based on the weight of said reaction mixture, of said component c).

10. The process of claim 4, wherein said reaction mixture additionally comprises up to about 40% by weight, based on the weight of said reaction mixture, of reinforcing fillers.

11. The process of claim 8, wherein said reaction mixture additionally comprises from about 5 to about 35% by weight, based on the weight of said reaction mixture, of reinforcing fillers.

12. The process of claim 1, wherein said component a) comprises the reaction product of pentaerythritol, adipic acid, and oleic acid.

13. The process of claim 12, wherein said reaction product has an acid number of less than 15 and a hydroxyl number of less than 15.

* * * * *